Figure 1:
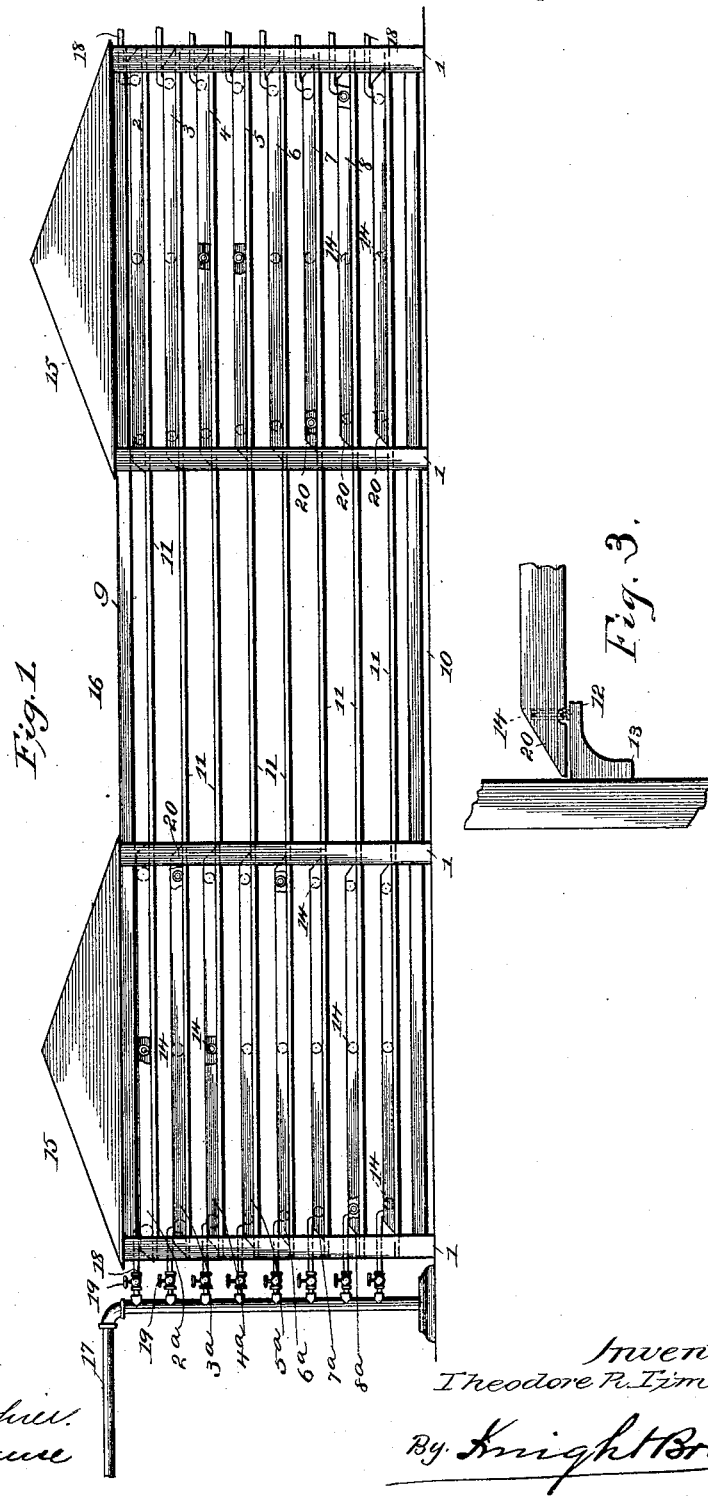

(No Model.) 5 Sheets—Sheet 1.
T. R. TIMBY.
APPARATUS FOR EVAPORATING BRINE.

No. 475,637. Patented May 24, 1892.

(No Model.)

5 Sheets—Sheet 2.

T. R. TIMBY.
APPARATUS FOR EVAPORATING BRINE.

No. 475,637.

Patented May 24, 1892.

Attest:
Harry S. Rohrer.
George E. Cruse

Inventor:
Theodore R. Timby,
By Knight Bros.
Attys.

(No Model.) 5 Sheets—Sheet 3.

T. R. TIMBY.
APPARATUS FOR EVAPORATING BRINE.

No. 475,637. Patented May 24, 1892.

Attest:
Harry F. Rohrer.
George E. Cruice.

Inventor:
Theodore R. Timby.
By Knight Bros.
Attys.

(No Model.) 5 Sheets—Sheet 4.
T. R. TIMBY.
APPARATUS FOR EVAPORATING BRINE.
No. 475,637. Patented May 24, 1892.

Attest:
Harry T. Rohrer.
George E. Cruse.

Inventor:
Theodore R. Timby.
By Knight Bros.
Attys.

(No Model.)  5 Sheets—Sheet 5.

T. R. TIMBY.
APPARATUS FOR EVAPORATING BRINE.

No. 475,637.  Patented May 24, 1892.

Attest:
Harry S. Rohrer
George E. Cruse

Inventor:
Theodore R. Timby.
By Knight Bros.
Attys.

UNITED STATES PATENT OFFICE.

THEODORE R. TIMBY, OF WASHINGTON, DISTRICT OF COLUMBIA.

APPARATUS FOR EVAPORATING BRINE.

SPECIFICATION forming part of Letters Patent No. 475,637, dated May 24, 1892.

Application filed October 20, 1891. Serial No. 409,284. (No model.)

*To all whom it may concern:*

Be it known that I, THEODORE R. TIMBY, a citizen of the United States, residing at Washington, in the District of Columbia, have invented a new and Improved Apparatus for Evaporating Brine by Atmospheric Action, of which the following is a specification.

My invention relates to apparatus for producing salt from brine which employs a number of evaporating-vats; and the invention has for its object to improve the quality of the salt, to economize space necessary for the accommodation of the vats and facilitate the manipulation of a large number of the same confined within a small space, to protect the vats from rain, and to increase the evaporative capacity of the said vats.

In the manufacture of salt heretofore vats have been spread about over enormously large areas of ground in single layers and exposed to the sun, as a supposed necessary provision in the successful evaporation of the liquor. In order to protect the vats from rain in time of storm, each vat is provided with a removable cover, and these covers have to be manipulated by hand and transferred to and from the vat or tray in rainy weather to prevent water entering the vat and in clear weather to allow the sun to get to the brine in order to crystallize the salt.

I have found by experiment that exposure to the sun is not a necessity in the successful evaporation of brine, owing to the fact that as soon as the fresh brine is exposed for a short period a precipitate is formed on the bottom of the vat and makes a white surface thereon, so that the further heating effect is destroyed. Moreover, the exposure of the brine to the sun has the effect of producing an inferior chalky-white grade of salt, which decreases its merchantable value. I have also found that by a certain arrangement which I shall proceed to describe and in which the sun is kept from the liquor the loss of the sun is not only compensated for, but is more than compensated for, by a large increase of air-supply and the manner in which the air is caused to pass over the surface of the liquor. I have also found that the increase in production is much greater than the increase in cost of manufacture by my invention.

My invention consists, broadly, in the arrangement of one or more vertical series of two or more superposed vats which protect one another, said vats being arranged in a suitable frame with a space of about six inches between them, adapted to slide in said frame, and the upper vat being provided with a cover likewise resting a distance above the edge of the vat. The vats are preferably very shallow, so that a whole series of eight or ten does not make a very high structure, and the advantages arising from thus arranging them are twofold. First, every vat is always protected from the weather without interfering with the evaporating process, which may therefore continue without interruption, and, secondly, the air will be deflected by each vat on the one which is located just below it, and the air will thereby be vibrated back and forth between the surface of the liquor and the bottom of the vat. This will result in a more rapid evaporation. Each vat of the series may be made slightly larger than or otherwise adapted to protect the one below it, as by projecting beyond said lower vat, so that any water or rain which beats against the sides of the tray will not be allowed to run into the vats below. This feature of the projection of the trays also greatly increases the amount of air deflected on the surface of the liquor.

My invention further consists in certain novel details in the construction of apparatus embodying the above principles, all of which will be hereinafter particularly pointed out in the claims, being first fully described with reference to the accompanying drawings, in which—

Figure 2:
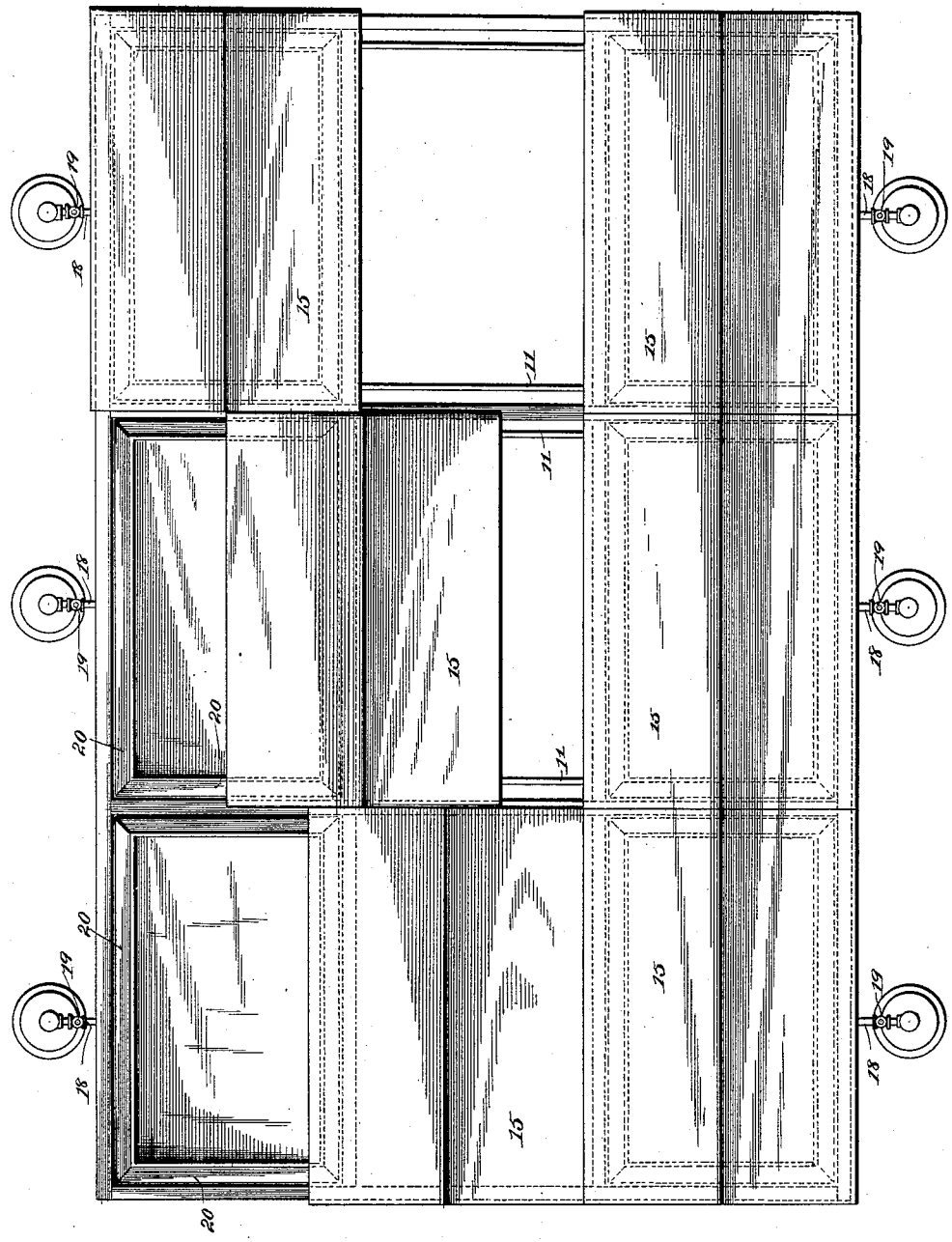
Figure 4:
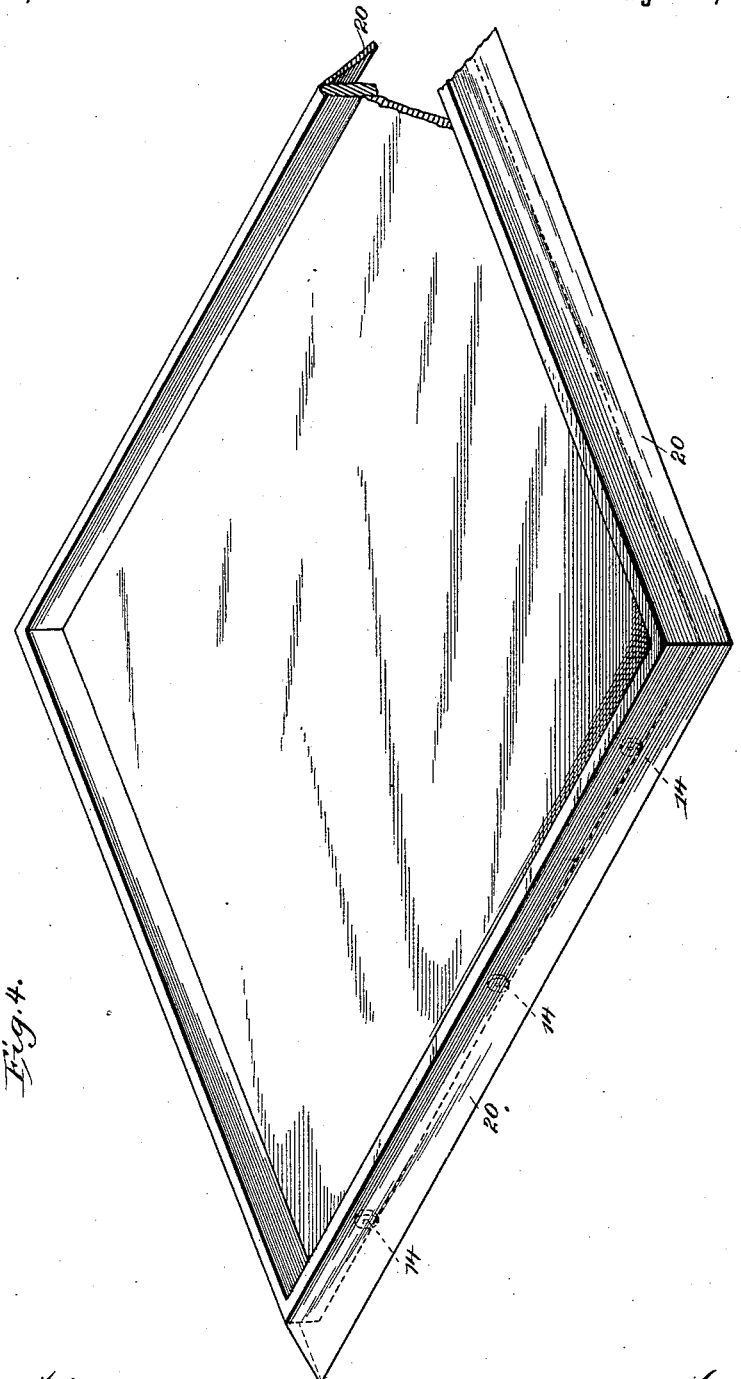
Figure 5:
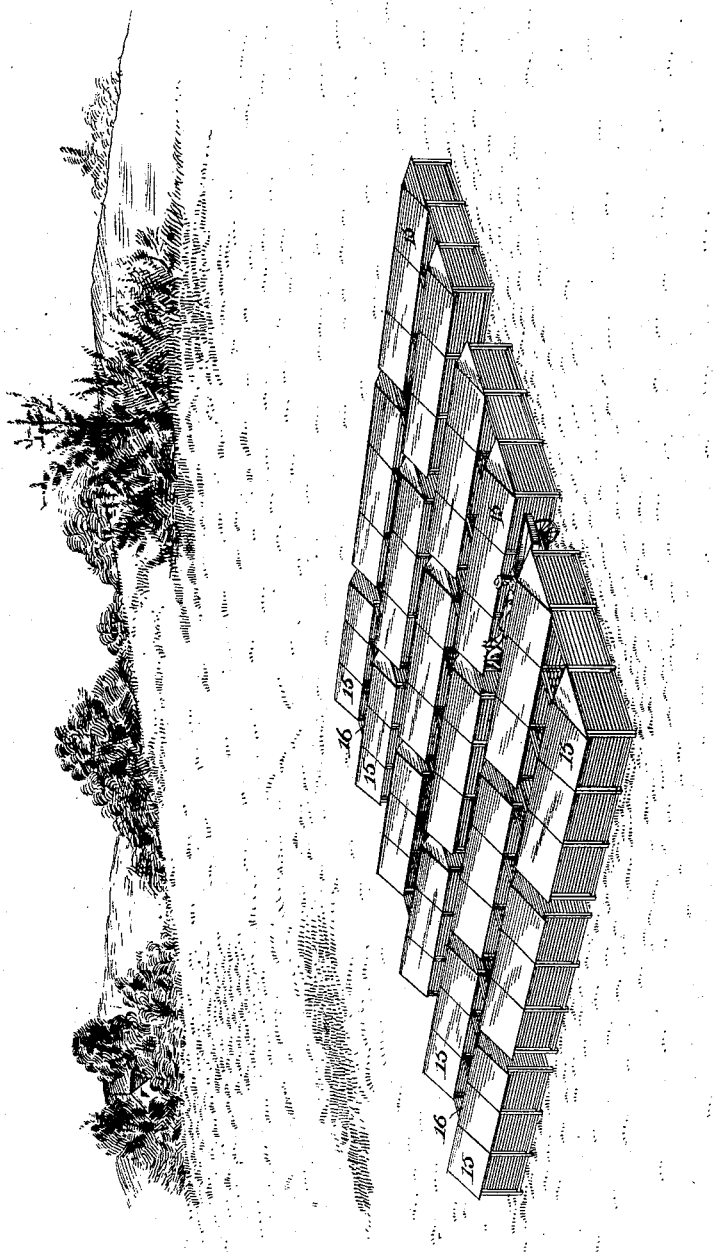
Figure 6:
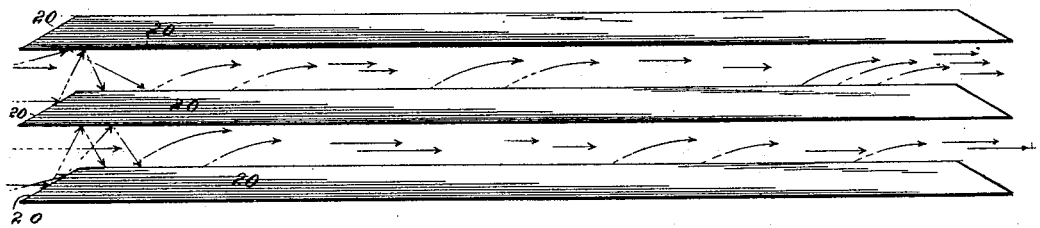

Figure 1 is a side elevation illustrating a frame in which are arranged in two rows vertical series of vats, a central space between said rows being left in order that any one of the vats may be uncovered by sliding those above it into said space or by sliding the cover if the top one is to be exposed. Fig. 2 is a plan of the same. Fig. 3 is an enlarged detail section showing one of the vats and the track upon which it is mounted. Fig. 4 is a perspective view of one of the vats. Fig. 5 is a perspective view of a plant in which a number of frames are employed. Fig. 6 is a detail view illustrating the deflection of air-currents between two vats.

1 represents a number of vertical posts of the frame upon which are mounted the trays or vats 2 3 4 5 &c., and 2ª 3ª 4ª 5ª, &c., which constitute the respective rows, and these vertical posts are connected by top and bottom horizontal rails 9 and 10.

11 represents the tracks which are arranged longitudinally at the ends of the respective vats, and there are two of these tracks for each tray. The tracks consist of suitable rails mounted upon longitudinal brackets 12, having flanges 13, by which said brackets are secured to end posts 1. The vats have a number, preferably three wheels 14, mounted in their sides at such points as will allow the bottom of the tray to rest in a plane lower than the tracks upon which it is supported, so that said tracks will not interfere with the air-currents. These tracks run from end to end of the frame, and they are so arranged that the vats may be readily moved upon them into the central space when any vat is to be uncovered. It is not intended that vats lying in the same plane shall be moved into the central space from opposite sides at the same time, as this would never be required in practice, and I am therefore enabled to save one-fourth the space which would otherwise be required to accommodate the vats.

In order to supply brine to the respective vats, supply-pipes 17 are run from the main or other source of supply, and into these pipes are tapped branches 18, having stop-cocks 19, said branches terminating above the respective vats. The liquor may therefore be delivered to the vats when they are in their normal positions and said vats may be put into the central space at will.

15 represents the rows of vats arranged in series, and 16 represents the central space into which they are slid.

The mode of using the apparatus is as follows: The vats being in the positions shown in Fig. 1, each is suitably filled with the brine and is allowed to remain until the evaporation is completed. A wagon is then driven alongside one vertical series of vats, the top cover is removed into the central space, the uppermost vat is emptied by shoveling the salt into the wagon, and the emptied vat is then shoved into the central space to uncover the next lower vat. This operation is repeated, each tray being emptied and shoved into the central space until the last is emptied, when all the vats of that series may be shoved back into normal position and immediately filled again with brine. The wagon is then driven to the next series, the individual vats of which are emptied in the same manner and then refilled, and thus the emptying operation may continue until all the salt is gathered. The vats may be arranged, as shown, in two rows with a central shifting-space between them, and each row may be made as long as desirable, there being as many vats as the frame will accommodate and the frame being made as large as convenient. A large number of frames may be placed end to end with just enough space between them for the admission of a man in shifting the parts, and the number of frames may also be extended in the other direction so long as space is left between the frames for the admission of a wagon, car, or other means, which may be employed for conveying away the salt.

I have found in experiment that salt precipitated in accordance with my present invention will be of a finer and more transparent crystalline quality, and therefore more merchantable, and that room, and consequently the cost, are economized in the degree that the vats are multiplied one above the other—as an illustration, the room obtained in a building of one story compared with a building of many stories covering the same area.

If desirable, any suitable form of appliance or tackle may be employed for shifting the vats back and forth.

In order to deflect the air into or between the vats to a greater extent, deflectors 20 may be attached to the ends and sides of the vats. These deflectors may be at any suitable angle to the horizontal, but are preferably less than forty-five degrees, in order that horizontal currents will be deflected upward against the bottom of the upper vat at such an angle as to cause the air to be deflected inward. If these deflectors are used, the necessity for graduating the sizes of the vats is obviated, for the reason that each deflector will shed water and keep it from entering the vat below. Moreover, the bottoms of all the deflectors on any vat are in the same horizontal plane with the bottom of said vat, and the bottom of each deflector co-operates with the deflecting-surface of the one below it to guide the deflected air into the vat to which said lower deflector is attached.

Having thus described my invention, the following is what I claim as new therein and desire to secure by Letters Patent:

1. The herein-described apparatus for obtaining salt, comprising an open frame or support and two or more superposed vats spaced apart for the passage of air between them, gradually increasing in size upward and arranged so that the sides of each vat above the first project beyond the sides of the vat immediately below it.

2. The apparatus for evaporating brine by atmospheric action, which consists in a suitable frame, a series of superposed vats mounted in said frame, and a cover for the upper vat, said frame being open and said vats being arranged in a vertical series with spaces between them communicating with the outer atmosphere and the sides of each vat above the first being made to project beyond those of the one below it for excluding rain and deflecting air, as explained.

3. In apparatus for evaporating brine by atmospheric action, the combination of the frame or support, the vertical series of vats arranged in said frame or support and gradually increasing in size upward, and a cover for the top vat, said vats being arranged with unobstructed air-spaces between them and said frame being open on its sides, having tracks upon which the vats are mounted and having an open space into which the vats may be slid individually, substantially in the manner and for the purpose explained.

4. In an apparatus for evaporating brine by atmospheric action, the combination of an open frame having tracks or ways and a series of superposed vats mounted upon the tracks or ways in said frame, exposed at the sides to the outer atmosphere, each having overhanging sides and forming a cover for the one below it, with spaces for horizontal circulation of air between them, said tracks or ways being in the horizontal planes of the sides of the vats, whereby they do not obstruct the passage of air between the vats, as explained.

5. An apparatus for evaporating salt by natural atmospheric action, consisting of an exposed vat having a suitable cover with overhanging sides supported above it and having air-deflectors at the sides for guiding the air between the vat and cover, said vat and cover being spaced apart and open at the sides, substantially as and for the purpose set forth.

6. In an apparatus for producing salt by natural atmospheric action, the combination of an exposed evaporating-vat provided on its sides with air-deflecting boards and having wheels or rollers in the horizontal plane of the sides of the vats and beneath the deflecting-boards, and a cover for said vat spaced above and overhanging said vat, whereby the air is received from the deflector and guided down into the vat, substantially as and for the purpose set forth.

7. In an apparatus for evaporating brine by natural atmospheric action, the combination of an open frame or support, and a vertical series of vats for containing brine, having vertical spaces between them open to the outer atmosphere and in which the bottom of one overhangs and forms a cover for the one below it and is movable for the purpose of uncovering the one beneath it, substantially as and for the purpose set forth.

8. A brine-evaporating plant consisting of a number of ranges of superposed vats sliding in supporting-frames disposed in pairs, with interposed driveways and slideways alternately arranged, the driveways between the pairs of frames or ranges and the slideways between the members of each pair, all as herein described, permitting the sliding of the vats successively from opposite sides into the open space between the members of each pair of frames and giving access of teams to the sides of the vats opposite that toward which they slide for the purpose of unloading each vat as it is uncovered by the successive sliding off of the superposed vats, as explained.

THEODORE R. TIMBY.

Witnesses:
HERVEY S. KNIGHT,
OCTAVIUS KNIGHT.